United States Patent [19]

Kayane et al.

[11] Patent Number: 4,631,341
[45] Date of Patent: Dec. 23, 1986

[54] ANTHRAQUINONE COMPOUND HAVING BOTH MONOHALOGENOTRIAZINYL AND VINYLSULFONE TYPE FIBER REACTIVE GROUPS

[75] Inventors: Yutaka Kayane, Ibaraki; Takashi Omura, Ashiya; Katsumasa Otake, Nara; Akira Takeshita, Toyonaka, all of Japan

[73] Assignee: Sumitomo Chemical Company, Limited, Osaka, Japan

[21] Appl. No.: 610,750

[22] Filed: May 16, 1984

[30] Foreign Application Priority Data

May 23, 1983 [JP] Japan .................. 58-91215
May 25, 1983 [JP] Japan .................. 58-092944
Oct. 26, 1983 [JP] Japan .................. 58-201835

[51] Int. Cl.⁴ ............................ C07D 251/50
[52] U.S. Cl. ................................... 544/189
[58] Field of Search .......................... 544/189

[56] References Cited

U.S. PATENT DOCUMENTS

| | | | |
|---|---|---|---|
| 3,935,208 | 1/1976 | Altermatt .................. | 544/189 |
| 4,214,082 | 7/1980 | Harms et al. ............... | 544/189 |
| 4,355,163 | 10/1982 | von Oertzen et al. ......... | 544/189 |
| 4,442,288 | 4/1984 | Meininger et al. ........... | 544/189 |

OTHER PUBLICATIONS

"Fundamentals of Chemistry and Application of Dyes", P. Rys and H. Zollinger, pp. 62-71, Wiley-Interscience Publishers, New York, (1972).

Primary Examiner—John M. Ford
Attorney, Agent, or Firm—Stevens, Davis, Miller & Mosher

[57] ABSTRACT

A compound, or a salt thereof, represented by the formula,

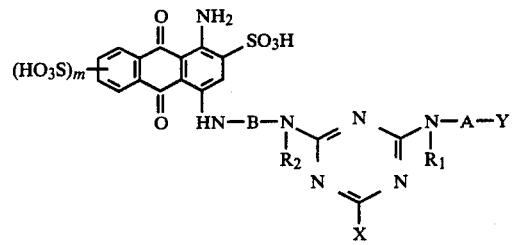

wherein X is a halogen atom, Y is a group of $-SO_2CH=CH_2$ or $-SO_2CH_2CH_2Z$ (in which Z is a group capable of being split by the action of an alkali), A is an unsubstituted or substituted phenylene or naphthylene group, B is a cycloalkylene group of the formula,

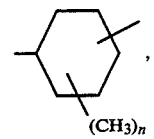

an arylene group of the formula,

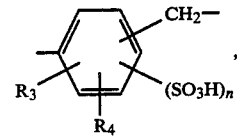

or an alkylene of the formula $-(CH_2)_l-$, (in which $R_3$ and $R_4$ are independently a hydrogen atom or a methyl, ethyl or methoxy group, n is 0, 1 or 2 and l is an integer of 2 to 6), $R_1$ and $R_2$ are independently a hydrogen atom or an unsubstituted or substituted lower alkyl group, and m is 0, 1 or 2, provided that the group Y is located at m- or p-position to the group

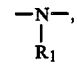

when B is the arylene group, which is useful for dyeing fiber materials, particularly cellulose fiber materials, in a blue color having excellent fastness, with excellent build-up and level-dyeing properties.

4 Claims, No Drawings

ANTHRAQUINONE COMPOUND HAVING BOTH MONOHALOGENOTRIAZINYL AND VINYLSULFONE TYPE FIBER REACTIVE GROUPS

The present invention relates to a fiber reactive compound useful for dyeing and printing fiber materials, a process for producing the same and a process for dyeing or printing fiber materials using the same.

More specifically, the invention relates to an anthraquinone compound having both monohalogenotriazinyl and vinylsulfone type fiber reactive groups, a process for producing the same, a process for dyeing and printing fiber materials, particularly celloluse fiber materials in a blue color.

As already known, there are great numbers of so-called reactive dyes useful for dyeing or printing fiber materials. Of these, reactive dyes having both monohalogenotriazinyl and vinylsulfone type fiber reactive groups are known to have prominent dye performances, as disclosed in U.S. Pat. Nos. 4341699, 4378313 and 4412948, European Pat. No. 21351, and British Pat. Nos. 2026527 and 2034343. Recently, however, reactive dyes of this kind particularly useful for dyeing or printing fiber materials in a blue color have been required to meet every needs for dye performances. It is eagerly desired to find such a reactive dye having a high solubility in water and an aqueous alkaline solution, excellent build-up, level-dyeing and wash-off properties and high exhaustion and fixation percentages, and being able to give a dyed or printed product of a deep color having excellent fastness properties.

Under these circumstances, the present inventors have undertaken extensive studies and found a specific anthraquinone compound which can meet such needs.

Thus, the present invention provides a compound, or a salt thereof, represented by the following formula (I),

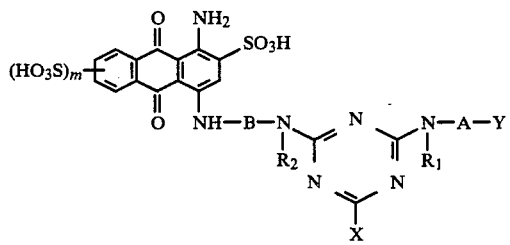

wherein X is a halogen atom, Y is a group of —SO$_2$CH=CH$_2$ or —SO$_2$CH$_2$CH$_2$Z (in which Z is a group capable of being split by the action of an alkali), A is an unsubstituted or substituted phenylene or naphthylene group, B is a cycloalkylene group of the formula,

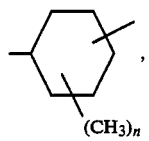

an arylene group of the formula,

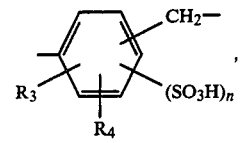

or an alkylene of the formula —(CH$_2$)$_l$—, (in which R$_3$ and R$_4$ are independently a hydrogen atom or a methyl, ethyl or methoxy group, n is 0, 1 or 2 and l is an integer of 2 to 6), R$_1$ and R$_2$ are independently a hydrogen atom or an unsubstituted or substituted lower alkyl group, and m is 0, 1 or 2, provided that the group Y is located at m- or p-position to the group

when B is the arylene group, and a process for producing the compound of the formula (I), which comprises reacting an aminoanthraquinone, or a salt thereof, represented by the formula (II),

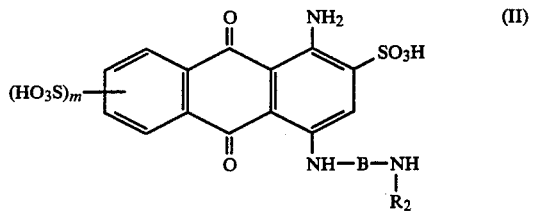

wherein B, R$_2$ and m are as defined above, and an amine compound represented by the formula (III),

wherein A, Y and R$_1$ are as defined above, with a trihalogenotriazine represented by the formula (IV),

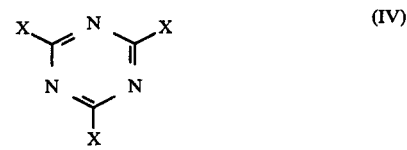

wherein X is as defined above, in an optional order.

The present invention also provides a process for dyeing fiber materials, which comprises using the compound of the formula (I).

Among the compounds represented by the above formula (I), preferred is a compound, or a salt thereof, represented by the following formula,

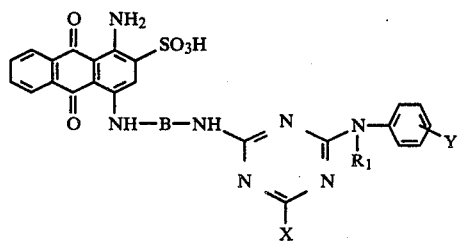

wherein X, Y, B and $R_1$ are as defined above.

In the above formula (I), the term "halogen" represented by X includes chlorine, bromine and fluorine. Of these, chlorine and fluorine are preferred.

The splittable group represented by Z includes, for example, a sulfuric acid ester, thiosulfuric acid ester, phosphoric acid ester or acetic acid ester group or a halogen atom.

The phenylene group represented by A may be unsubstituted or substituted with one or two members selected from the group consisting of bromine and chlorine atoms and methyl, ethyl, methoxy, ethoxy and sulfo groups, and the naphthylene group also represented by A may be unsubstituted or substituted with one sulfo group. Examples thereof are as follows.

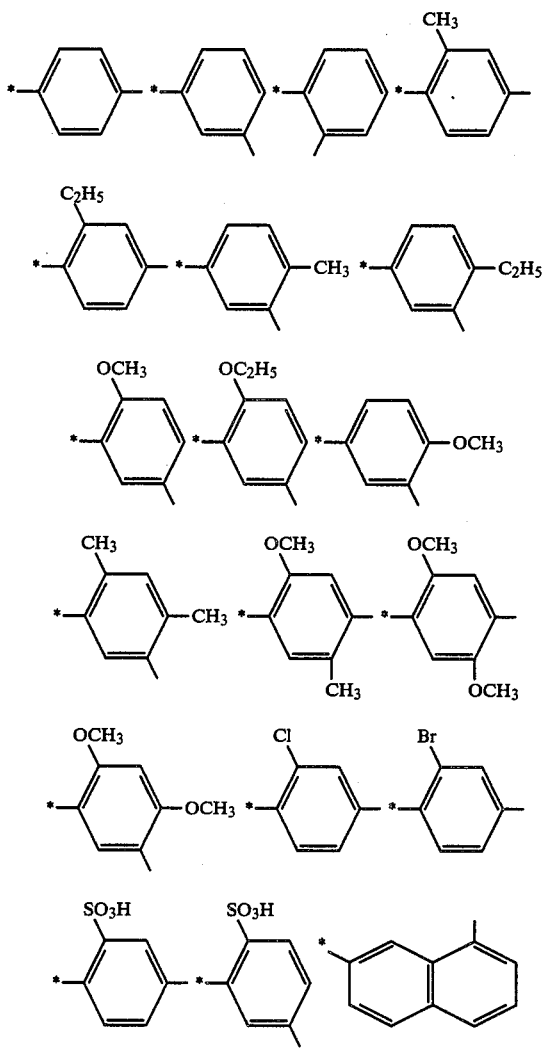

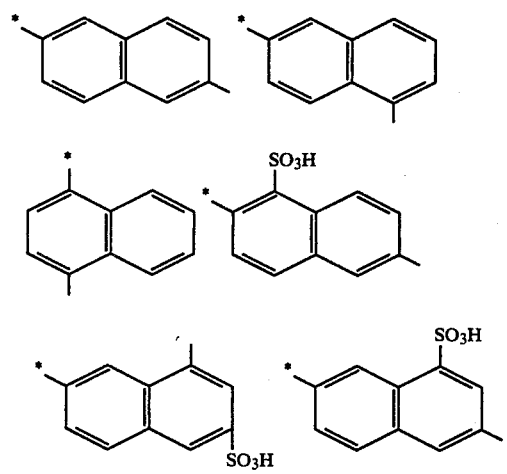

(In the above formulas, the asterisked linkage is bonded to the group

Of these, preferred A is the unsubstituted or substituted phenylene group.

The lower alkyl group represented by $R_1$ or $R_2$ includes preferably an alkyl group having 1 to 4 carbon atoms, and the substituent of the lower alkyl group includes, for example, hydroxy, cyano, alkoxy, carboxy, carbamoyl, alkoxycarbonyl, alkylcarbonyloxy, sulfo and sulfamoyl groups and halogen atoms. Examples of $R_1$ and $R_2$ are hydrogen, methyl, ethyl, n-propyl, iso-propyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like.

Examples of the amine compounds (III) usable in the process of the present invention are as follows:

1-Aminobenzene-2,3 or 4-β-sulfatoethylsulfone
1-Aminobenzene-2,3 or 4-β-acetoethylsulfone
1-Aminobenzene-3-phosphatoethylsulfone
1-Amino-4-methylbenzene-3-β-sulfatoethylsulfone 1-Aminobenzene-3-β-chloroethylsulfone
1-Amino-4-methoxybenzene-3-β-sulfatoethylsulfone
1-Amino-2,5-dimethoxybenzene-4-β-sulfatoethylsulfone
1-Amino-2-methoxybenzene-4-β-sulfatoethylsulfone
1-Amino-2-chlorobenzene-4-β-sulfatoethylsulfone
1-Amino-2-methoxybenzene-5-β-sulfatoethylsulfone
2-Aminonaphthalene-8-sulfatoethylsulfone
2-Aminonaphthalene-8-β-sulfatoethylsulfone-6-sulfonic acid
1-Amino-2,5-dimethoxybenzene-4-vinylsulfone
1-Amino-2-methoxy-5-methylbenzene-4-β-sulfatoethylsulfone
2-Aminonaphthalene-4-, 5-, 6- or 7-β-sulfatoethylsulfone
1-Amino-2-bromobenzene-4-β-sulfatoethylsulfone
1-Amino-2-bromobenzene-4-vinylsulfone
2-Amino-8-sulfonaphthalene-6-β-sulfatoethylsulfone
2-Aminonaphthalene-8-β-phosphatoethylsulfone-6-sulfonic acid
2-Aminonaphthalene-8-vinylsulfone-6-sulfonic acid
1-Amino-2-methoxy-5-methylbenzene-4-β-chloroethylsulfone
1-Aminobenzene-2-, 3- or 4-vinylsulfone
1-Amino-2-methoxy-5-chlorobenzene-4-β-sulfatoethylsulfone or -4-vinylsulfone
1-Amino-2-ethoxy-5-chlorobenzene-4-β-sulfatoethylsulfone or -4-vinylsulfone
2-Aminonaphthalene-6-β-sulfatoethylsulfone-1-sulfonic acid
5-Chloroaniline-2-β-sulfatoethylsulfone
5-Sulfoaniline-2-β-sulfatoethylsulfone
Aniline-2-β-thiosulfatoethylsulfone
5-Chloroaniline-2-β-thiosulfatoethylsulfone
5-Sulfoaniline-2-β-thiosulfatoethylsulfone
Aniline-2-β-phosphatoethylsulfone
5-Chloroaniline-2-β-phosphatoethylsulfone
5-Sulfoaniline-2-β-phosphatoethylsulfone
5-Chloroaniline-2-vinylsulfone
5-Sulfoaniline-2-vinylsulfone
Aniline-2-β-chloroethylsulfone
5-Chloroaniline-2-β-chloroethylsulfone
5-Sulfoaniline-2-β-chloroethylsulfone The amine compounds (III) also include N-lower alkyl amines corresponding to the above-exemplified amine compounds.

The anthraquinone compound of the formula (I) can be produced by subjecting the aminoanthraquinone compound of the formula (II) or a salt thereof and the amine compound of the formula (III) to condensation with the trihalogenotriazine of the formula (IV) in an optional order.

The first condensation between any one of the aminoanthraquinone (II) or the amine compound (III) and the trihalogenatriazine (IV) can be carried out in an aqueous medium at a temperature of −10° to 40° C., while controlling the pH to between 2 and 9, and the second condensation can be carried out by adding the remaining one to the reaction mixture of the first condensation and allowing the mixture to react at a temperature of 20° to 70° C., while controlling the pH to between 2 and 9.

The anthraquinone compound of the formula (I) thus obtained may be in the form of a free acid or a salt, preferably alkali metal or alkaline earth metal salt. Particularly preferred are sodium, potassium and calcium salts.

The anthraquinone compound (I) produced in accordance with the present invention may be in a liquid form obtained by removing inorganic salts or adding a dyeing improver, if necessary, after completion of the reaction, or may be formed into a powdery product by subjecting the above liquid or the reaction mixture as such to evaporation i.e. spray-drying and the like, or into either liquid or powdery product through salting out of the desired compound in a conventional manner using an electrolyte.

The anthraquinone compound (I) having two kinds of fiber reactive groups may be used as a reactive dye for dyeing hydroxyl group-, or amide group-containing materials.

The hydroxyl group-containing materials include natural or synthetic hydroxyl group-containing fiber materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane.

Examples of the materials, particularly in the fibrous forms, are wool and other animal furs, silk, leather, polyamide-6,6, polyamide-6, polyamide-11 and polyamide-4.

The dyeing may be carried out in a manner suitable for the reactive groups appended to the fiber-reactive dye.

For example, in the case of dyeing cellulose fiber materials, the dyeing may be carried out by an exhaustion dyeing, printing, padding including cold-pad-batch-up method or the like, from which a suitable one may be chosen depending on the property and physical form of the fibers.

More concretely speaking, the exhaustion dyeing may be carried out at a relatively low temperature using a dye bath containing an acid binding agent and if desired, a neutral salt such as sodium sulfate and sodium chloride, and additives such as dissolution assistants, penetrants and level dyeing agents. The neutral salt capable of promoting the exhaustion of the compound into the fiber materials may be added after or/and before the temperature of the dye bath reaches a desired level for the dyeing.

The padding may be carried out by applying a padding solution to the fiber material at ambient or elevated temperatures, drying the padding materials and then steaming or dry-heating the same to effect the fixation.

The printing may be carried out in a one-phase manner wherein the fiber materials may be printed with a printing paste containing an acid binding agent, followed by steaming at a temperature of 100° to 160° C., or a two-phase manner wherein the fiber materials may be printed with a neutral or weakly acidic printing paste, followed by passing through a hot alkaline bath containing an electrolyte, or over-padding with an alkaline padding solution containing an electrolyte, and then subjected to steaming or dry-heating. The printing paste may be prepared in a conventional manner using a thickener such as sodium alginate and starch ether and an emulsifier, if desired, along with conventional printing assistants such as urea, dispersing agents and the like.

The acid binding agent useful for fixing the anthraquinone compound (I) to the cellulose fiber materials includes water-soluble basic salts such as alkali or alkaline earth metal salts of inorganic or organic acids and compounds capable of liberating alkalis under heating conditions. Preferred are alkali metal hydroxides and alkali metal salts of inorganic or organic acids having a weak or medium strength. Particularly preferred are sodium and potassium salts. Examples thereof are sodium hydroxide, potassium hydroxide, sodium hydrogencarbonate, sodium carbonate, sodium formate, potassium carbonate, mono, di or trisodium phosphate, sodium silicate, sodium trichloroacetate and the like.

In dyeing the amide group-containing fiber materials, the fiber materials may be dipped into a dye bath under acid or weak acid conditions to effect the exhaustion, and then the bath may be made alkaline to effect the fixation. The dyeing may be carried out usually at a temperature of 60° to 120° C. In order to obtain a level-dyed product, there may be incorporated into the dye bath a level dyeing agent such as a condensation product of cyanuric chloride and 3 mole times of aminobenzenesulfonic acid or aminonaphthalenesulfonic acid, or an addition product of stearylamine and ethylene oxide.

The anthraquinone compound of the present invention can give remarkable advantages in the dyeing or printing fiber materials. Particularly when used for dyeing or printing cellulose fiber materials, the present compound can exhibit excellent build-up, level-dyeing and washing-off properties along with high exhaustion and fixation percentages, and give a dyed or printed product excellent in light fastness, perspiration-light fastness, abrasion fastness, wet fastness such as washing resistance, chlorine-containing water resistance, chlorine-bleaching resistance, alkali resistance, perspiration resistance and peroxide-washing resistance, acid-hydrolysis fastness and iron fastness.

Moreover, the anthraquinone compound of the present invention can exhibit a high solubility and give a dyed or printed product constant in the quality irrespective of change in the dyeing temperature or bath ratio.

The present invention is illustrated in more detail with reference to the following Examples, which are only illustrative of the present invention. In Examples, parts and % are by weight, unless otherwise specified.

EXAMPLE 1

Cyanuric chloride (9.2 parts) was dispersed in water (100 parts) at 5° to 10° C.

To this dispersion, a solution prepared by dissolving 1-aminobenzene-4-β-sulfatoethylsulfone (14 parts) in water (100 parts) at a pH of between 4 and 5, was added dropwise taking over 1 hour while controlling the pH within a range of between 4 and 5 using a 20% aqueous solution of sodium carbonate, and the mixture was stirred for 3 hours at 5° to 10° C.

To this reaction mixture, a suspension of sodium 1-amino-4-(4'-aminocyclohexylamino)-anthraquinone-2-sulfonate (21 parts) in water (200 parts) was added at 20° to 30° C. while controlling the pH within a range of between 6 and 7 using a 20% aqueous solution of sodium carbonate, and the mixture was stirred for 5 hours at the same temperature and pH as above.

Sodium chloride (40 parts) was added to the reaction mixture, and the crystals precipitated were collected on a suction filter, washed and dried at 60° C., thus obtaining an anthraquinone compound of the following formula.

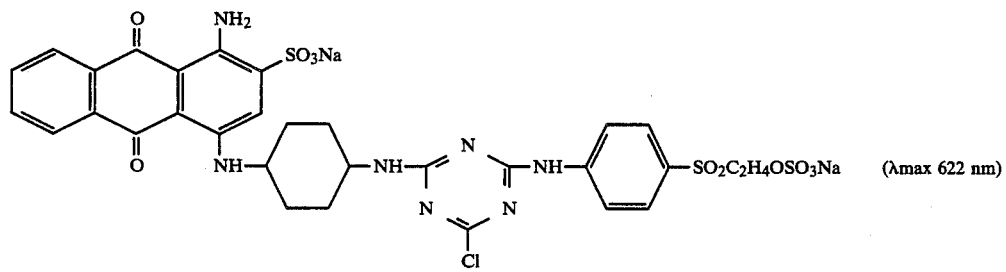

(λmax 622 nm)

EXAMPLES 2 TO 17

Example 1 was repeated, provided that sodium 1-amino-4-(4'-aminocyclohexylamino)-anthraquinone-2-sulfonate, 1-aminobenzene-4-β-sulfatoethylsulfone and/or cyanuric chloride were replaced by the aminoanthraquinone (II), amine compound (III) and/or trihalogenotriazine (IV) shown in the following table, respectively, whereby each corresponding anthraquinone compound was obtained.

| Exp. No. | (II) | (III) | (IV) |
|---|---|---|---|
| 2 | ![anthraquinone with SO3H, NH-cyclohexyl-NH2] | H2N-C6H4-SO2C2H4OSO3H | cyanuric chloride (trichlorotriazine) |

-continued

| Exp. No. | (II) | (III) | (IV) |
|---|---|---|---|
| 3 | " | H₂N–C₆H₃(OCH₃)–SO₂C₂H₄OSO₃H (4-OCH₃, 3-SO₂C₂H₄OSO₃H) | " |
| 4 | 1-amino-4-(4-aminocyclohexylamino)anthraquinone-2-sulfonic acid | H₂N–C₆H₄–SO₂C₂H₄OSO₃H | " |
| 5 | 1-amino-4-(4-aminocyclohexylamino)-7-sulfo-anthraquinone-2-sulfonic acid | H₂N–C₆H₄–SO₂C₂H₄OSO₃H (meta) | " |
| 6 | 1-amino-4-(4-aminocyclohexylamino)anthraquinone-2-sulfonic acid | H₂N–C₆H₄–SO₂C₂H₄SSO₃H | " |
| 7 | 1-amino-4-(4-aminocyclohexylamino)-7-sulfo-anthraquinone-2-sulfonic acid | H₂N–C₆H₃(CH₃)(SO₂C₂H₄OSO₃H) | " |
| 8 | 1-amino-4-(4-aminocyclohexylamino)-7-sulfo-anthraquinone-2-sulfonic acid | H₂N–C₆H₄–SO₂C₂H₄Cl (meta) | " |
| 9 | 1-amino-4-(4-aminocyclohexylamino)-5,8-disulfo-anthraquinone-2-sulfonic acid | H₂N–C₆H₄–SO₂CH=CH₂ | " |

(Note: Column (II) and (III) show chemical structures; textual descriptions given as approximations.)

-continued

| Exp. No. | (II) | (III) | (IV) |
|---|---|---|---|
| 10 | 1-amino-4-[(3-amino-2-methylcyclohexyl)amino]anthraquinone-2-sulfonic acid | $H_2N$—C$_6$H$_4$—SO$_2$C$_2$H$_4$OSO$_3$H (para) | " |
| 11 | 1-amino-4-[(3-amino-4-methylcyclohexyl)amino]anthraquinone-2-sulfonic acid | $H_2N$—C$_6$H$_4$—SO$_2$C$_2$H$_4$OSO$_3$H (meta) | " |
| 12 | " | 2,5-dimethoxy-4-aminophenyl-SO$_2$C$_2$H$_4$OSO$_3$H | " |
| 13 | 1-amino-4-[(3-amino-5,5-dimethylcyclohexyl)amino]anthraquinone-2-sulfonic acid | 2-amino-5-(β-sulfatoethylsulfonyl)benzenesulfonic acid | " |
| 14 | 1-amino-4-[(4-methylaminocyclohexyl)amino]anthraquinone-2-sulfonic acid | 2-chloro-4-aminophenyl-SO$_2$C$_2$H$_4$OSO$_3$H | " |
| 15 | 1-amino-4-[(4-ethylaminocyclohexyl)amino]anthraquinone-2-sulfonic acid | $H_2N$—C$_6$H$_4$—SO$_2$C$_2$H$_4$OCOCH$_3$ | " |
| 16 | 1-amino-4-{[4-(2-carboxyethylamino)cyclohexyl]amino}anthraquinone-2-sulfonic acid | 6-amino-2-naphthyl-SO$_2$C$_2$H$_4$OSO$_3$H | " |

| Exp. No. | (II) | (III) | (IV) |
|---|---|---|---|
| 17 | 1-amino-4-(aminocyclohexylamino)anthraquinone-2-sulfonic acid structure | H₂N—C₆H₄—SO₂C₂H₄OSO₃H | 2,4,6-tribromo-1,3,5-triazine |

EXAMPLE 18

The anthraquinone compound obtained in Example 1 (0.1, 0.3 and 0.6 part) was dissolved in water (200 parts) to prepare each dye bath. Sodium sulfate (10 parts) and cotton (10 parts) were added to the bath, and the bath was heated to 60° C., at which sodium carbonate (4 parts) was added. The dyeing was continued for 1 hour at this temperature. The cotton was rinsed with water, soaped, again rinsed with water, and then dried to obtain each dyed product of a brilliant blue color having excellent fastness, particularly light fastness and perspiration light fastness.

The anthraquinone compound used was found to exhibit excellent build-up and level-dyeing properties with high reproducibility.

EXAMPLE 19

The anthraquinone compound obtained in Example 5 (0.3 part) was dissolved in water (200 parts) to prepare a dye bath. Cotton (10 parts) was dipped thereinto, and the bath was heated to 50° C. 30 Minutes thereafter, sodium carbonate (4 parts) was added thereto, and the dyeing was continued for 1 hour at that temperature. The cotton was rinsed with water and soaped to obtain a dyed product of a brilliant blue color having excellent fastness, particularly light fastness and perspiration light fastness.

EXAMPLE 20

To a solution prepared by dissolving 1-N-ethylaminobenzene-4-β-sulfatoethylsulfone (15.5 parts) in water (200 parts) at a pH of between 4 and 5, and cooled to 5° to 10° C., was added cyanuric chloride (9.2 parts), and the mixture was stirred for 3 hours at 5° to 10° C. while controlling the pH within a range of between 4 and 5 using a 15% aqueous solution of sodium carbonate.

A suspension of sodium 1-amino-4-(3'-aminocyclohexylamino)-anthraquinone-2-sulfonate (21 parts) in water (200 parts) was added to the above reaction mixture, and the resulting mixture was stirred for 5 hours at 30° to 35° C. while controlling the pH within a range of between 5 and 6 using a 15% aqueous solution of sodium carbonate.

Sodium chloride (60 parts) was added to the reaction mixture, and the crystals precipitated were collected on a suction filter, washed and dried at 60° C., thus obtaining an anthraquinone compound of the following formula.

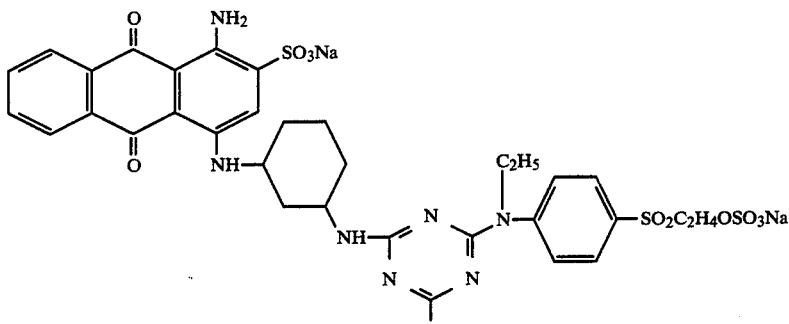

(λmax 622 nm)

EXAMPLES 21 TO 28

Example 20 was repeated, provided that sodium 1-amino-4-(3'-aminocyclohexylamino)-anthraquinone-2-sulfonate, 1-N-ethylaminobenzene-4-β-sulfatoethylsulfone and/or cyanuric chloride were replaced by the aminoanthraquinone (II), amine compound (III) and/or trihalogenotriazine (IV) shown in the following table, respectively, whereby each corresponding anthraquinone compound was obtained.

| Exp. No. | (II) | (III) | (IV) |
|---|---|---|---|
| 21 | 1-amino-4-(4-aminocyclohexylamino)anthraquinone-2-sulfonic acid | 3-(2-sulfatoethylsulfonyl)-N-ethylaniline | cyanuric chloride (2,4,6-trichloro-1,3,5-triazine) |
| 22 | " | 3-(vinylsulfonyl)aniline with HN-C₂H₄COOH | " |
| 23 | " | 3-(2-sulfatoethylsulfonyl)-N-propylaniline | " |
| 24 | 1-amino-4-(3-aminocyclohexylamino)anthraquinone-2-sulfonic acid | 3-(2-sulfatoethylsulfonyl)aniline with HN-C₂H₄CONH₂ | " |
| 25 | " | 3-(2-sulfatoethylsulfonyl)aniline with HN-C₂H₄OH | " |
| 26 | 1-amino-4-(4-aminocyclohexylamino)-7-sulfo-anthraquinone-2-sulfonic acid | 4-(vinylsulfonyl)-N-methylaniline | " |
| 27 | 1-amino-4-(4-aminocyclohexylamino)anthraquinone-2-sulfonic acid | 4-methoxy-3-(2-sulfatoethylsulfonyl)-N-ethylaniline | " |
| 28 | " | 4-(2-sulfatoethylsulfonyl)-N-ethylaniline | 2,4,6-trifluoro-1,3,5-triazine |

EXAMPLE 29

The anthraquinone compound obtained in Example 20 (0.1, 0.3 and 0.6 part) was dissolved in water (200 parts) to prepare each dye bath. Sodium sulfate (20 parts) and then cotton (10 parts) were added thereto, and the bath was heated to 70° C. 30 Minutes thereafter, sodium carbonate (3 parts) was added; and the dyeing was continued for 1 hour at that temperature. Thereafter, the cotton was rinsed with water and soaped to obtain each dyed product of a brilliant blue color having excellent fastness, particularly light fastness and perspiration light fastness.

The anthraquinone compound used was found to have excellent solubility and exhibit excellent build-up and level-dyeing properties with high reproducibility.

EXAMPLE 30

The anthraquinone compound obtained in Example 22 (0.3 part) was dissolved in water (200 parts) to prepare a dye bath. Sodium sulfate (20 parts) and then cotton (10 parts) were added thereto, and the bath was heated to 60° C. 20 Minutes thereafter, trisodium phosphate (3 parts) was added thereto, and the dyeing was continued for 1 hour at that temperature. Then, the cotton was rinsed with water and soaped to obtain a dyed product of a brilliant blue color having excellent fastness.

EXAMPLE 31

Using the anthraquinone compound obtained in Example 1, a printing paste having the following composition was prepared.

|  | Part |
| --- | --- |
| Anthraquinone compound | 5 |
| Urea | 5 |
| Thickener, sodium alginate (5%) | 50 |
| Hot water | 25 |
| Sodium hydrogencarbonate | 2 |
| Balance (water) | 13 |

Mercerized cotton broad cloth was printed with the printing paste, pre-dried, and then steamed for 5 minutes at 100° C. The cloth was rinsed with hot water, soaped, again rinsed with hot water, and then dried to obtain a printed product of a brilliant blue color having excellent fastness.

EXAMPLE 32

Example 1 was repeated, provided that sodium 1-amino-4-(5'-aminomethyl-4'-methyl-2'-sulfoanilino)anthraquinone-2-sulfonate (26 parts) was used in place of 1-amino-4-(4'-aminocyclohexylamino)-anthraquinone-2-sulfonate (21 parts), whereby an anthraquinone compound of the following formula was obtained.

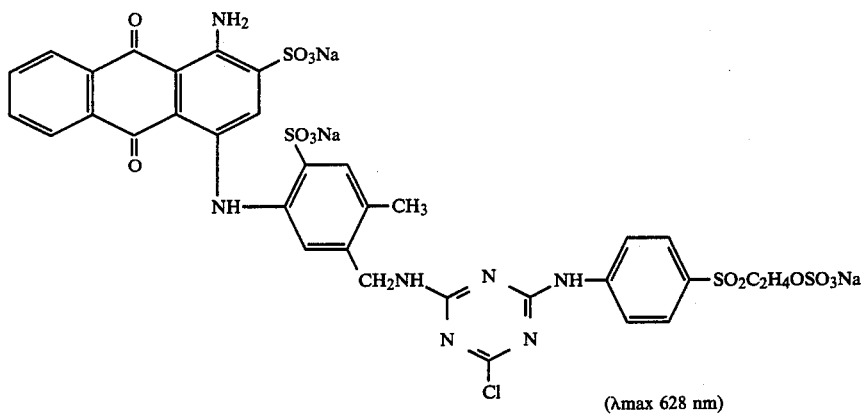

(λmax 628 nm)

EXAMPLES 33 TO 48

Example 32 was repeated, provided that sodium 1-amino-4-(5'-aminomethyl-4'-methyl-2'-sulfoanilino)anthraquinone-2-sulfonate, 1-aminobenzene-4-β-sulfatoethylsulfone and/or cyanuric chloride were replaced by the aminoanthraquinone, amine compound and/or trihalogenotriazine shown in the following table, respectively, whereby each corresponding anthraquinone compound was obtained.

| Exp. No. | (II) | (III) | (IV) |
|---|---|---|---|
| 34 | 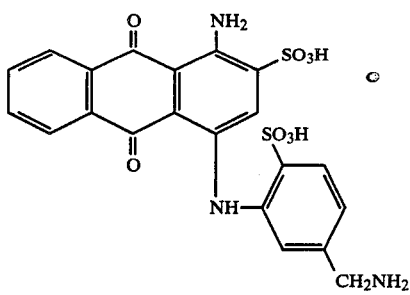 | 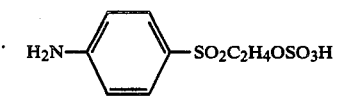 | " |
| 35 | " | 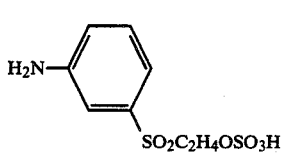 | " |
| 36 | 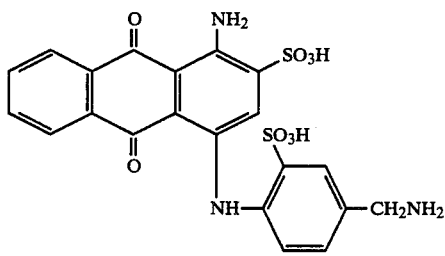 | 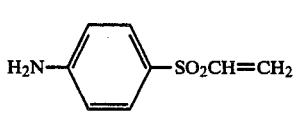 | " |
| 37 | " | 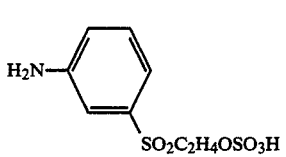 | " |
| 38 | 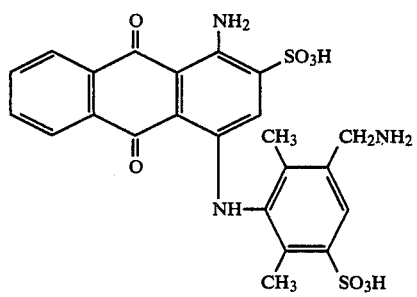 | 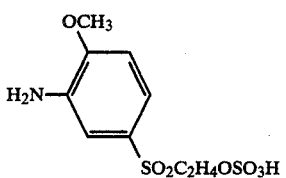 | " |
| 39 | 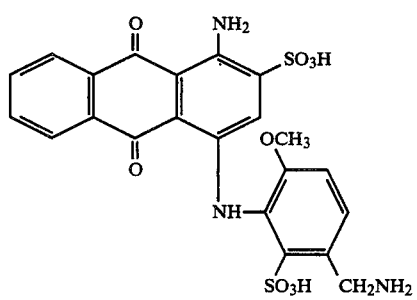 | 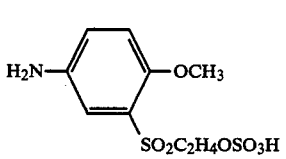 | 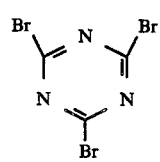 |

-continued

| Exp. No. | (II) | (III) | (IV) |
|---|---|---|---|
| 40 | 1-amino-4-[(2-aminomethyl-4-methyl-6-sulfo)phenylamino]anthraquinone-2-sulfonic acid | H₂N–C₆H₄–SO₂C₂H₄SSO₃H | 2,4,6-trichloro-1,3,5-triazine |
| 41 | 1-amino-4-[(2-aminomethyl-4-methoxy-5-sulfo)phenylamino]anthraquinone-2-sulfonic acid | 2,5-dimethoxy-4-(SO₂C₂H₄OSO₃H)aniline | " |
| 42 | 1-amino-4-[(4-aminomethyl-2,5-disulfo)phenylamino]anthraquinone-2-sulfonic acid | H₂N–C₆H₄–SO₂CH=CH₂ | " |
| 43 | 1-amino-4-[(2-aminomethyl-4-ethyl-5-sulfo)phenylamino]anthraquinone-2-sulfonic acid | H₂N–C₆H₄–SO₂C₂H₄OCOCH₃ | " |
| 44 | 1-amino-4-[(2-methylaminomethyl-5-sulfo)phenylamino]anthraquinone-2-sulfonic acid | 3-(SO₂C₂H₄OSO₃H)aniline | " |

-continued

| Exp. No. | (II) | (III) | (IV) |
|---|---|---|---|
| 45 | 1-amino-4-[(4-methylaminomethyl-2-sulfo)phenylamino]anthraquinone-2-sulfonic acid (anthraquinone with NH₂, SO₃H, and NH-C₆H₃(SO₃H)-CH₂NH-CH₃ substituents) | " | " |
| 46 | anthraquinone with NH₂, SO₃H, and NH-C₆H₃(SO₃H)-CH₂NH-C₂H₅ substituents | H₂N–C₆H₃(CH₃)–SO₂C₂H₄OSO₃H | " |
| 47 | 6-sulfo anthraquinone with NH₂, SO₃H, and NH-C₆H₃(SO₃H)-CH₂NH₂ substituents | H₂N–C₆H₄–SO₂C₂H₄OSO₃H | " |
| 48 | 5,8-disulfo anthraquinone with NH₂, SO₃H, and NH-C₆H₄-CH₂NH-CH₃ substituents | H₂N–(naphthyl)–SO₂C₂H₄OSO₃H | " |

EXAMPLE 49

The anthraquinone compound obtained in Example 32 (0.1, 0.3 and 0.6 part) was dissolved in water (200 parts) to prepare each dye bath. Sodium sulfate (10 parts) and then cotton (10 parts) were added thereto, and the bath was heated to 60° C., at which temperature sodium carbonate (4 parts) was added. The dyeing was continued for 1 hour at that temperature. The cotton was rinsed with water, soaped, again rinsed with water, and then dried to obtain a dyed product of a brilliant blue color having excellent fastness, particularly light fastness and perspiration light fastness.

The anthraquinone compound used was found to have excellent solubility and exhibit excellent build-up and level-dyeing properties with high reproducibility.

EXAMPLE 50

The anthraquinone compound obtained in Example 35 (0.3 part) was dissolved in water (200 parts) to prepare a dye bath. Cotton (10 parts) was dipped thereinto, and the bath was heated to 50° C. 30 Minutes thereafter, sodium carbonate (4 parts) was added, and the dyeing was continued for 1 hour at that temperature. Then, the cotton was rinsed with water and soaped to obtain a dyed product of a brilliant blue color having excellent fastness, particularly light fastness and perspiration light fastness.

EXAMPLE 51

Example 20 was repeated, provided that sodium 1-amino-4-(5'-aminomethyl-2'-sulfoanilino)-anthraquinone-2-sulfonate (25 parts) was used in place of sodium 1-amino-4-(3'-aminocyclohexylamino)-anthraquinone- 2-sulfonate (21 parts), whereby an anthraquinone compound of the following formula was obtained.

none-2-sulfonate, 1-N-ethylaminobenzene-4-β-sulfatoethylsulfone and/or cyanuric chloride were replaced by the aminoanthraquinone (II), amine compound (III) and trihalogenotriazine (IV), whereby each corresponding anthraquinone compound was obtained.

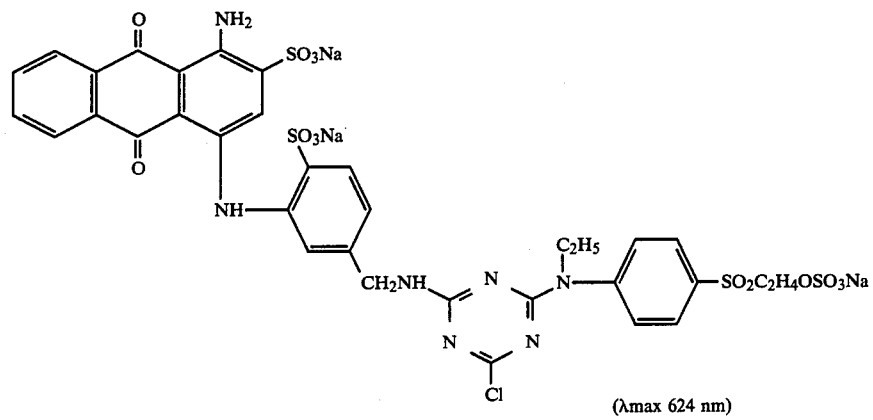

(λmax 624 nm)

EXAMPLES 52 TO 59

Example 51 was repeated, provided that sodium 1-amino-4-(5′-aminomethyl-2′-sulfoanilino)-anthraquinone- -continued

| Exp. No. | (II) | (III) | (IV) |
|---|---|---|---|
| 56 | 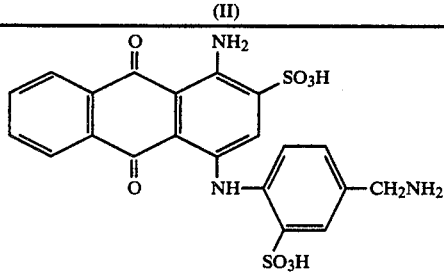 | 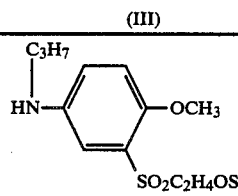 | 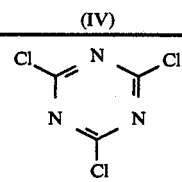 |
| 57 | 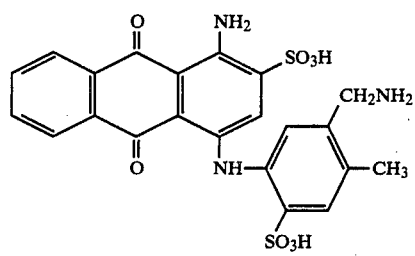 | 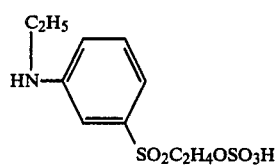 | 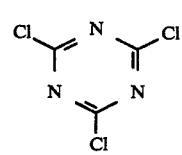 |
| 58 | 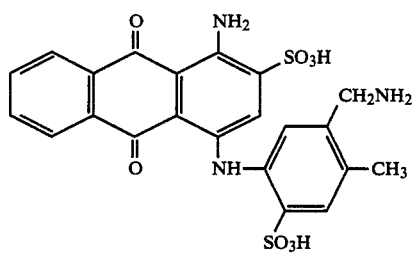 | 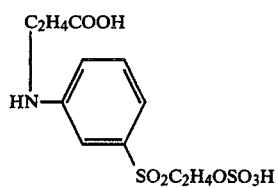 | 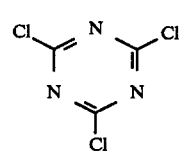 |
| 59 | 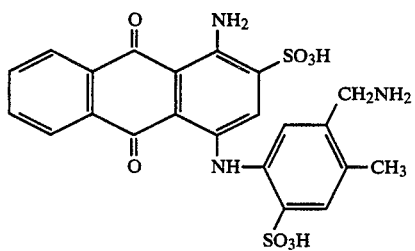 | 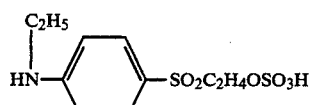 | 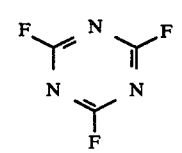 |

EXAMPLE 60

The anthraquinone compound obtained in Example 51 (0.1, 0.3 and 0.6 part) was dissolved in water (200 parts) to obtain each dye bath. Sodium sulfate (20 parts) and then cotton (10 parts) were added thereto, and the bath was heated to 70° C. 30 Minutes thereafter, sodium carbonate (3 parts) was added thereto, and the dyeing was continued for 1 hour at that temperature. Then, the cotton was rinsed with water and soaped to obtain each dyed product of a brilliant blue color having excellent fastness, particularly, light fastness and perspiration light fastness.

The anthraquinone compound used was found to have excellent solubility, and exhibit excellent build-up and level-dyeing properties with high reproducibility.

EXAMPLE 61

The anthraquinone compound obtained in Example 53 (0.3 part) was dissolved in water (200 parts) to prepare a dye bath. Sodium sulfate (20 parts) and then cotton (10 parts) were added thereto, and the bath was heated to 60° C. 20 Minutes thereafter, trisodium phosphate (3 parts) was added thereto, and the dyeing was continued for 1 hour at that temperature. Then, the cotton was rinsed with water and soaped to obtain a dyed product of a brilliant blue color having excellent fastness.

EXAMPLE 62

Using the anthraquinone compound obtained in Example 32, a printing paste having the following composition was prepared.

|  | Part |
|---|---|
| Anthraquinone compound | 5 |
| Urea | 5 |
| Thickener, sodium alginate (5%) | 50 |
| Hot water | 25 |
| Sodium hydrogencarbonate | 2 |
| Balance (water) | 13 |

Mercerized cotton broad cloth was printed with the printing paste. The cloth printed was pre-heated and then steamed for 5 minutes at 100° C. Thereafter, the cloth was rinsed with hot water, soaped, again rinsed with hot water, and then dried to obtain a printed product of a brilliant blue color having excellent fastness.

EXAMPLE 63

Example 1 was repeated, provided that sodium 1-amino-4-(3'-aminopropylamino)-anthraquinone-2-sulfonate (20 parts) was used in place of sodium 1-amino-4-(4'-aminocyclohexylamino)-anthraquinone-2-sulfonate (21 parts), and the second condensation was carried out at 40° to 50° C., whereby an anthraquinone compound of the following formula was obtained.

EXAMPLES 64 TO 79

Example 63 was repeated, provided that sodium 1-amino-4-(3'-aminopropylamino)-anthraquinone-2-sulfonate, 1-aminobenzene-4-β-sulfatoethylsulfone and/or cyanuric chloride were replaced by the aminoanthraquinone (II), amine compound (III), and trihalogenotriazine (IV) shown in the following table, whereby each corresponding anthraquinone compound was obtained.

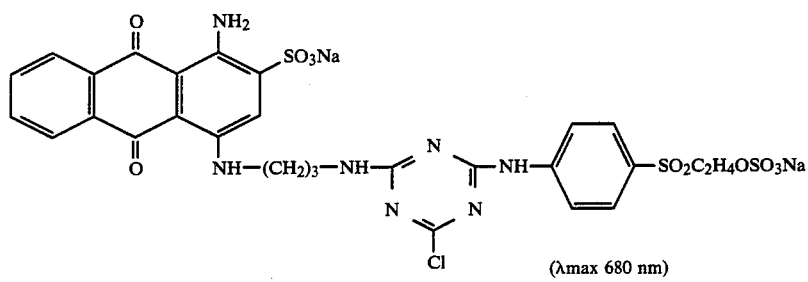

($\lambda$max 680 nm)

| Exp. No. | (II) | (III) | (IV) |
|---|---|---|---|
| 64 | 1-amino-2-SO$_3$H-4-NH—(CH$_2$)$_3$—NH$_2$ anthraquinone | H$_2$N—C$_6$H$_4$—SO$_2$C$_2$H$_4$OSO$_3$H | cyanuric chloride |
| 65 | " | H$_2$N—C$_6$H$_3$(OCH$_3$)—SO$_2$C$_2$H$_4$OSO$_3$H | " |
| 66 | 1-amino-2-SO$_3$H-4-NH—(CH$_2$)$_6$—NH$_2$ anthraquinone | H$_2$N—C$_6$H$_4$—SO$_2$C$_2$H$_4$OSO$_3$H | " |
| 67 | 1-amino-2-SO$_3$H-4-NH—(CH$_2$)$_3$—NH$_2$-7-SO$_3$H anthraquinone | H$_2$N—C$_6$H$_4$—SO$_2$C$_2$H$_4$OSO$_3$H | " |
| 68 | 1-amino-2-SO$_3$H-4-NH—(CH$_2$)$_3$—NH$_2$ anthraquinone | H$_2$N—C$_6$H$_4$—SO$_2$C$_2$H$_4$SSO$_3$H | " |

-continued

| Exp. No. | (II) | (III) | (IV) |
|---|---|---|---|
| 69 | 1-amino-4-[(3-aminopropyl)amino]-7-sulfo-anthraquinone-2-sulfonic acid (with HO₃S at 7-position, NH₂ at 1, SO₃H at 2, NH-(CH₂)₃-NH₂ at 4) | 4-amino-2-methylphenyl with SO₂C₂H₄OSO₃H | " |
| 70 | 1-amino-4-[(3-aminopropyl)amino]-6-sulfo-anthraquinone-2-sulfonic acid | 3-aminophenyl-SO₂C₂H₄Cl | " |
| 71 | 1-amino-4-[(4-aminobutyl)amino]-anthraquinone-2,5,8-trisulfonic acid | 4-aminophenyl-SO₂CH=CH₂ | " |
| 72 | 1-amino-4-[(2-aminoethyl)amino]-anthraquinone-2-sulfonic acid | 4-aminophenyl-SO₂C₂H₄OSO₃H | " |
| 73 | 1-amino-4-[(6-aminohexyl)amino]-anthraquinone-2-sulfonic acid | 3-aminophenyl-SO₂C₂H₄OSO₃H | " |
| 74 | " | 4-amino-2-methoxyphenyl-SO₂C₂H₄OSO₃H | " |
| 75 | 1-amino-4-[(4-aminobutyl)amino]-anthraquinone-2-sulfonic acid | 4-amino-3-sulfophenyl-SO₂C₂H₄OSO₃H | " |
| 76 | 1-amino-4-[(2-aminoethyl)amino]-anthraquinone-2-sulfonic acid | 4-amino-3-chlorophenyl-SO₂C₂H₄OSO₃H | " |
| 77 | 1-amino-4-[(3-aminopropyl)amino]-7-sulfo-anthraquinone-2-sulfonic acid | 4-aminophenyl-SO₂C₂H₄OCOCH₃ | " |

| Exp. No. | (II) | (III) | (IV) |
|---|---|---|---|
| 78 | 1-amino-4-(6'-aminohexylamino)-7-sulfo-anthraquinone-2-sulfonic acid | 6-amino-2-(β-sulfatoethylsulfonyl)naphthalene | " |
| 79 | 1-amino-4-(3'-aminopropylamino)-anthraquinone-2-sulfonic acid | 3-amino-(β-sulfatoethylsulfonyl)benzene | 2,4,6-tribromo-1,3,5-triazine |

EXAMPLE 80

The anthraquinone compound obtained in Example 63 (0.1, 0.3 and 0.6 part) was dissolved in water (200 parts) to prepare each bye bath. Sodium sulfate (10 parts) and then cotton (10 parts) were added thereto, and the bath was heated to 60° C., at which sodium carbonate (4 parts) was added. The dyeing was continued for 1 hour at that temperature. Then, the cotton was rinsed with water, soaped, again rinsed with water and dried to obtain each dyed product of a brilliant blue color having excellent fastness, particularly, light fastness and perspiration light fastness.

The anthraquinone compound used was found to exhibit excellent build-up and level-dyeing properties with high reproducibility.

EXAMPLE 81

The anthraquinone compound obtained in Example 66 (0.3 part) was dissolved in water (200 parts) to prepare a dye bath. Cotton (10 parts) was dipped thereinto, and the bath was heated to 50° C. 30 Minutes thereafter, sodium carbonate (4 parts) was added thereto, and the dyeing was continued for 1 hour at that temperature. Then, the cotton was rinsed with water and soaped to obtain a dyed product of a brilliant blue color having excellent fastness.

EXAMPLE 82

Example 20 was repeated, provided that sodium 1-amino-4-(6'-aminohexylamino)-anthraquinone-2-sulfonate was used in place of sodium 1-amino-4-(3'-aminocyclohexylamino)-anthraquinone-2-sulfonate, whereby an anthraquinone compound of the following formula was obtained.

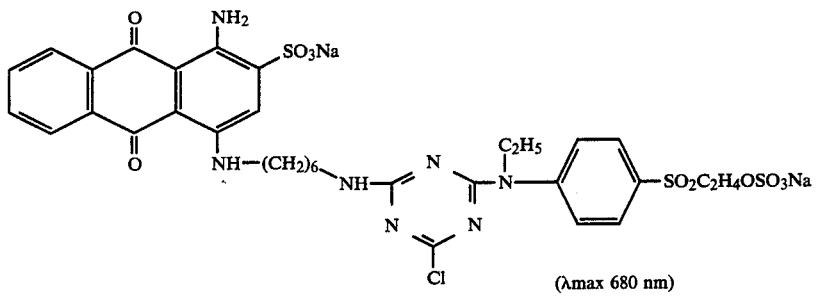

(λmax 680 nm)

EXAMPLES 83 TO 90

Examples 82 was repeated, provided that sodium 1-amino-4-(6'-aminohexylamino)-anthraquinone-2-sulfonate, 1-N-ethylaminobenzene-4-β-sulfatoethylsulfone and/or cyanuric chloride were replaced by the aminoanthraquinone (II), amine compound (III) and trihalogenotriazine (IV) shown in the following table, whereby each corresponding anthraquinone compound was obtained.

| Exp. No. | (II) | (III) | (IV) |
|---|---|---|---|
| 83 | 1-amino-4-(3'-aminopropylamino)-anthraquinone-2-sulfonic acid | N-ethyl-(β-sulfatoethylsulfonyl)aniline | cyanuric chloride |

-continued

| Exp. No. | (II) | (III) | (IV) |
|---|---|---|---|
| 84 | " | HN—C₆H₄(C₂H₄COOH)(SO₂CH=CH₂) | " |
| 85 | " | HN—C₆H₄(C₃H₇)(SO₂C₂H₄OSO₃H) | " |
| 86 | 1-NH₂-2-SO₃H-4-NH-(CH₂)₆-NH₂ anthraquinone | HN—C₆H₄(C₂H₄CONH₂)(SO₂C₂H₄OSO₃H) | " |
| 87 | " | HN—C₆H₄(C₂H₄OH)(SO₂C₂H₄OSO₃H) | " |
| 88 | 1-NH₂-2-SO₃H-4-NH-(CH₂)₅-NH₂-7-SO₃H anthraquinone | HN—C₆H₄(CH₃)—SO₂CH=CH₂ | " |
| 89 | 1-NH₂-2-SO₃H-4-NH-(CH₂)-NH₂ anthraquinone | HN—C₆H₄(C₂H₅)(OCH₃)(SO₂C₂H₄OSO₃H) | " |
| 90 | " | HN—C₆H₄(C₂H₅)—SO₂C₂H₄OSO₃H | trifluorotriazine |

EXAMPLE 91

The anthraquinone compound obtained in Example 82 (0.1, 0.3 and 0.6 part) was dissolved in water (200 parts) to prepare each dye bath. Sodium sulfate (20 parts) and then cotton (10 parts) were added thereto, and the bath was heat to 70° C. 30 Minutes thereafter, sodium carbonate (3 parts) was added thereto, and the dyeing was continued for 1 hour at that temperature. Then, the cotton was rinsed with water and soaped to obtain a dyed product of a brilliant blue color having excellent fastness, particularly light fastness and perspiration light fastness.

The anthraquinone compound used was found to have excellent solubility and exhibit excellent build-up and level-dyeing properties with high reproducibility.

EXAMPLE 92

The anthraquinone compound obtained in Example 84 (0.3 part) was dissolved in water (200 parts) to prepare a dye bath. Sodium sulfate (20 parts) and then cotton (10 parts) were added thereto, and the bath was heated to 60° C. 20 Minutes thereafter, trisodium phosphate (3 parts) was added thereto, and the dyeing was continued for 1 hour at that temperature. Then, the cotton was rinsed with water and soaped to obtain a dyed product of a brilliant blue color having excellent fastness.

EXAMPLE 93

Using the anthraquinone compound obtained in Example 63, a printing paste having the following composition was prepared.

|  | Part |
|---|---|
| Anthraquinone compound | 5 |
| Urea | 5 |
| Thickener, sodium alginate (5%) | 50 |
| Hot water | 25 |
| Sodium hydrogencarbonate | 2 |
| Balance (water) | 13 |

Mercerized cotton broad cloth was printed with the printing paste. The cloth was pre-dried, steamed for 5 minutes at 100° C., then rinsed with hot water, soaped, again rinsed with hot water and dried to obtain a printed product of a brilliant blue color having excellent fastness.

What is claimed is:

1. A compound, or a salt thereof, represented by the formula,

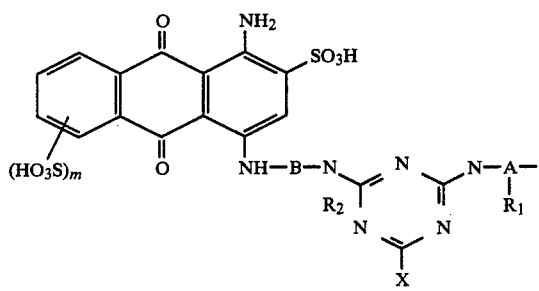

wherein X is a halogen atom, Y is —SO$_2$CH=CH$_2$ or —SO$_2$CH$_2$CH$_2$Z, wherein Z is selected from the group consisting of sulfuric acid ester; thiosulfuric acid ester; phosphoric acid ester; acetic acid ester; and a halogen atom, A is a phenylene group unsubstituted or substituted with one or two members selected from the group consisting of bromine and chlorine atoms, methyl, ethyl, methoxy, ethoxy and sulfo groups, or a naphthalene group unsubstituted or substituted with one sulfo group, B is a cycloalkylene group of the formula,

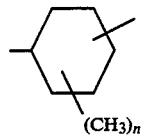

an arylene group of the formula,

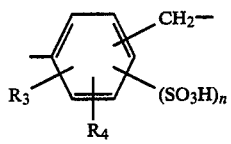

or an alkylene of the formula —(CH$_2$)$_l$—, wherein R$_3$ and R$_4$ are independently a hydrogen atom or a methyl, ethyl or methoxy group, n is 0, 1 or 2 and l is an integer of 2 to 6, R$_1$ and R$_2$ are independently a hydrogen atom, an unsubstituted lower alkyl group or a substituted lower alkyl group substituted by hydroxy, cyano, alkoxy, carboxy, carbamoyl, alkoxycarbonyl, alkylcarbonyloxy, sulfo, sulfomoyl or halogen atoms, and m is 0, 1 or 2, provided that the group Y is located at m- or p-position to the group

when B is the arylene group.

2. The compound according to claim 1, wherein A is a phenylene group unsubstituted or substituted with one or two members selected from the group consisting of bromine and chlorine atoms, methyl, ethyl, methoxy, ethoxy, and sulfo groups, or a naphthalene group unsubstituted or substituted with one sulfo group.

3. The compound according to claim 1, wherein R$_1$ is a hydrogen atom an unsubstituted lower alkyl group or a substituted lower alkyl group substituted by hydroxy, cyano, alkoxy, carboxy, carbamoyl, alkoxycarbonyl, alkylcarbonyloxy, sulfo, sulfomoyl and halogen atoms, and R$_2$ is a hydrogen atom.

4. A compound, or a salt thereof, represented by the formula,

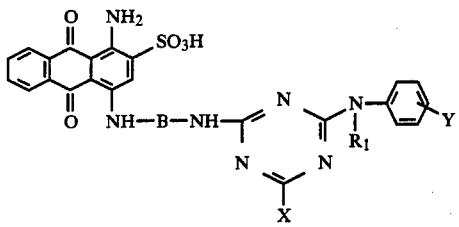

wherein Y is —SO$_2$CH=CH$_2$ or —SO$_2$CH$_2$CH$_2$Z, wherein Z is selected from the group consisting of sulfuric acid ester; thiosulfuric acid ester; phosphoric acid ester; acetic acid ester; or a halogen atom, B is a cycloalkylene group of the formula,

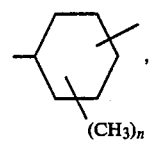

an arylene group of the formula

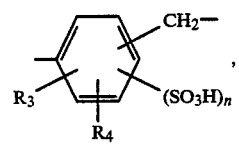

or an alkylene group or the formula, —(CH$_2$)$_l$—, wherein R$_3$ and R$_4$ are independently a hydrogen atom or a methyl, ethyl or methoxy group, n is 0, 1 or 2 and l is an integer of 2 to 6, and R$_1$ is a hydrogen atom or an unsubstituted lower alkyl group or a substituted lower alkyl group substituted by hydroxy, cyano, alkoxy, carboxy, carbamoyl, alkoxycarbonyl, alkylcarbonyloxy, sulfo, sulfomoyl and halogen atoms.

* * * * *